(12) United States Patent
Brandt et al.

(10) Patent No.: US 7,936,489 B2
(45) Date of Patent: May 3, 2011

(54) HOLOGRAPHIC INFORMATION DISPLAY

(75) Inventors: Peter Brandt, Aschaffenburg (DE); Heiko Charle, Rüsselsheim (DE); Daniel Sahlbom, Mellerud (SE); Steven Stringfellow, Oakland, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1108 days.

(21) Appl. No.: 11/673,061

(22) Filed: Feb. 9, 2007

(65) Prior Publication Data

US 2008/0192045 A1 Aug. 14, 2008

(51) Int. Cl.
 *G03H 1/00* (2006.01)
(52) U.S. Cl. ............................................. 359/14; 345/7
(58) Field of Classification Search .................. 359/3–7, 359/9, 13, 14, 29, 630–631; 345/7–9
See application file for complete search history.

(56) References Cited

U.S. PATENT DOCUMENTS

| | | | |
|---|---|---|---|
| 7,095,562 B1* | 8/2006 | Peng et al. | 359/630 |
| 2005/0052714 A1* | 3/2005 | Klug et al. | 359/3 |
| 2007/0081207 A1* | 4/2007 | Bimber | 359/9 |
| 2007/0217018 A1* | 9/2007 | Fredriksson | 359/631 |

* cited by examiner

*Primary Examiner* — Stephone B Allen
*Assistant Examiner* — Jennifer L. Doak
(74) *Attorney, Agent, or Firm* — Ingrassia Fisher & Lorenz, P.C.

(57) ABSTRACT

In a holographic heads-up display, a first set of data and a second set of data are provided. A three-dimensional image or scenery displaying the first set of data in a first layer and the second set of data in a second layer are created. The first layer is separated from the second layer by a specified distance. A hologram is determined, which corresponds to a recording of the scenery via a reference beam. A plurality of controllable phase delay elements are set according to the determined hologram. The hologram is reconstructed by illuminating the plurality of phase delay elements using a coherent light source. The light of the reconstructed hologram is directed into the visual field of a driver via a wind screen of a vehicle.

16 Claims, 2 Drawing Sheets

HOLOGRAPHIC INFORMATION DISPLAY

FIELD OF THE INVENTION

The present invention relates to information displays of the type used in connection with automotive vehicles and the like, and more particularly relates to holographic heads-up displays.

BACKGROUND

Various display and user interface devices are often used to assist a driver when steering a car and/or to increase driver comfort. Such devices are used to provide information and to allow the driver to set system parameters—e.g. the temperature of the air conditioner.

Heads-up displays are commonly used for projecting such information into the sight field of the driver. The driver can then perceive the information and manipulate the devices while keeping watch on traffic.

The information content displayed by such heads-up displays is limited due to the resolution of projectors and the relatively small viewing area that is used. Hence, one set of data will mask or otherwise interfere with another set of data when both are displayed at the same time.

BRIEF SUMMARY

The present invention provides an improved scheme for projecting different sets of data at the same time. According to a first embodiment, a method for displaying data is provided, which includes: providing a first set of data and a second set of data each to be displayed; creating a three-dimensional scenery displaying the first set of data in a first layer and the second set of data in a second layer, the first layer being separated from the second layer by a specified virtual distance; determining a hologram corresponding to a recording of the scenery via a reference beam; setting a plurality of controllable phase delay elements according to the determined hologram; reconstructing the hologram by illuminating the plurality of phase delay elements using a coherent light source; and directing the light of the reconstructed hologram into the visual field of a driver via a wind screen of the vehicle.

According to a second aspect, a holographic information display is provided, comprising: a plurality of controllable phase delay elements for forming a hologram; a coherent light source for reconstructing the hologram via illuminating the hologram; an interface for receiving a first and a second set of data; a scenery-composing device for automatically creating the scenery according to a first and a second set of data in a first and a second layer, the first layer being separated from the second layer by a specified virtual distance; a transformation unit for automatically calculating the hologram corresponding to a recording of the scenery via a reference beam; and a control unit for controlling the plurality of phase delay elements according to the calculated hologram.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

The present invention will hereinafter be described in conjunction with the following drawing figures, wherein like numerals denote like elements.

Same reference signs designate alike or functionally identical elements throughout the description.

DETAILED DESCRIPTION OF THE INVENTION

The following detailed description of the invention is merely exemplary in nature and is not intended to limit the invention or the application and uses of the invention. Furthermore, there is no intention to be bound by any theory presented in the preceding background of the invention or the following detailed description of the invention.

Figure 1:
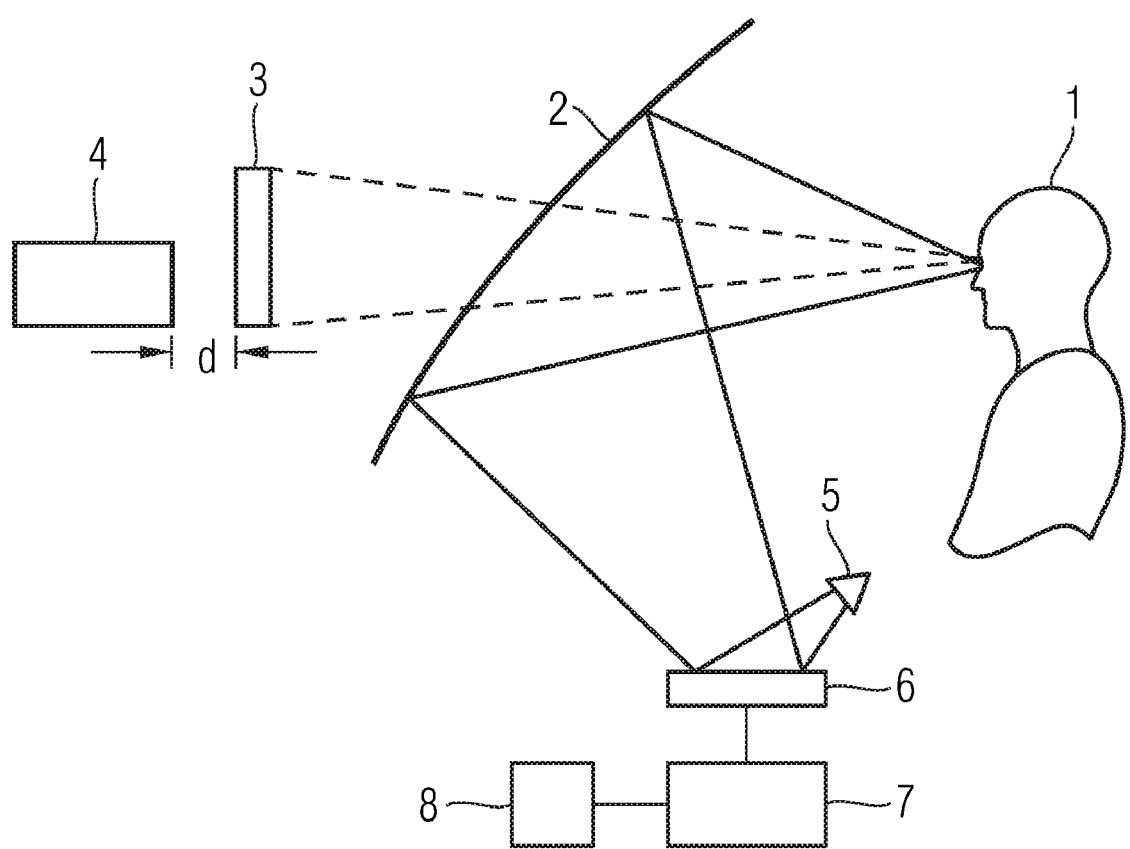
FIG. 1 is a sketch of an embodiment using a holographic information display.

FIG. 1 shows a driver 1 looking through a windscreen 2 of his vehicle (e.g, an automobile or any other vehicle). Due to a holographic information display—described in detail below—he sees two projected objects 3 and 4. The projected objects 3, 4 appear to be outside of the windscreen 2. Both projected objects 3, 4 give the impression of being three-dimensional. That is to say, if the driver 1 moves his head, he sees the objects 3, 4 under a different angle, as with a real object.

One or both of the objects 3, 4 may have a virtual thickness of almost zero. Such a flat object appears, hence, not three-dimensional. The objects 3, 4 appear to be separated by a virtual distance d. When moving his head, the driver sees the object 3 ahead sliding with respect to the object 4 behind due to a parallax. Accordingly, the eyes of the driver register two different images of the two objects 3, 4. In the brain these two different images are interpreted as objects having a depth and a distance d with respect to each other. In general, a driver will pay more attention to the information shown by the first object 3. In one embodiment, the order of object is sorted according to the importance of the information to be presented.

Figure 2:
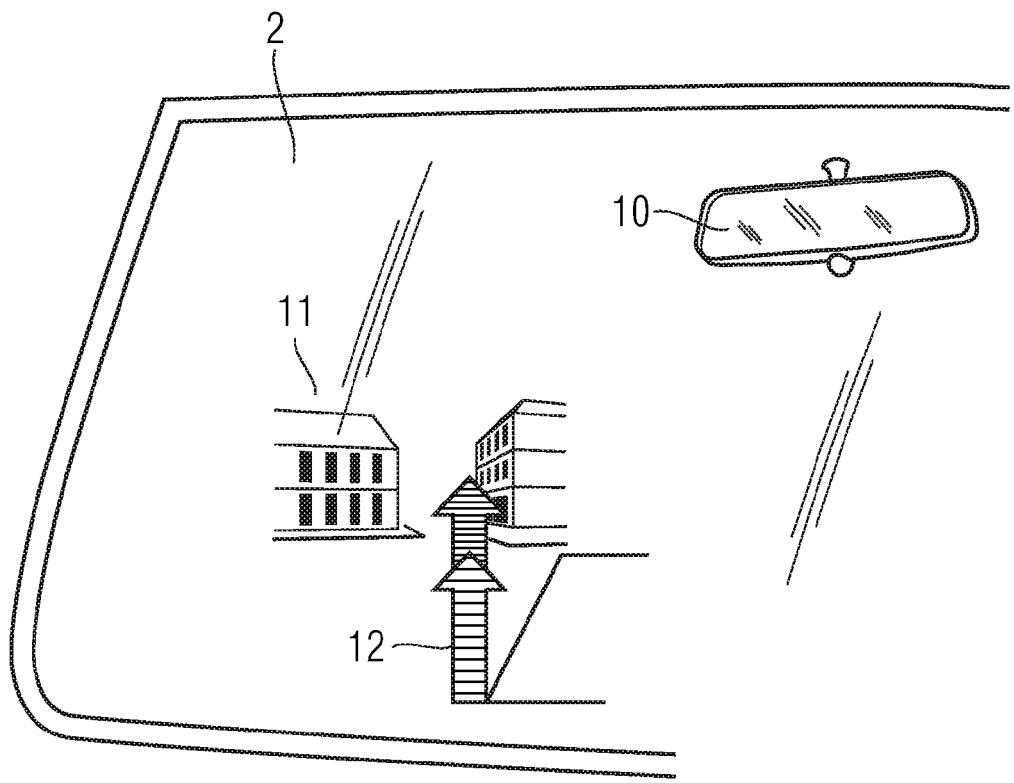
FIG. 2 is a view field of a driver corresponding to FIG. 1.

An example of information to be displayed is illustrated in FIG. 2, which shows the view through the windscreen 2. A night vision system provides data related to the environment of the vehicle. The night vision system may consist of two cameras installed in a rear view mirror 10. A computer device (e.g., microprocessor, CPU, etc.) determines a three-dimensional scenery 11 based on the images taken by the two cameras. The holographic information display projects this three-dimensional scenery as though object 4 is behind object 3 (as shown in FIG. 1).

A navigation system provides data related to the desired destination. A marker, e.g. arrow 12, is projected by the holographic information display as object 3 ahead. The position and direction of the marker is preferably adapted to be standing in front of a road shown by the three-dimensional scenery 11 of the environment.

The driver 1 realizes that the marker 12 and the three-dimensional scenery 11 are different objects due to their different virtual distance to the driver. A slight movement of the head leads to a slight sliding of the marker 12 with respect to the scenery 11.

The projected objects may represent solid objects, i.e. having opaque surfaces. The marker 12 for instance can hide parts of the scenery. The objects may represent objects having transparent or semi-transparent surfaces, as well. The marker 12 for instance only partly hides the scenery. The driver 1 can spot light from the scenery passing through the marker 12. He is able to look through the marker under different angles, as well. Thus, he gains the three-dimensional impression of the object 4 behind.

A holographic information display comprises a coherent light source 5 and an adjustable diffractive unit 6. The diffractive unit 6 deflects light from the light source 5 via the windscreen 2 into the visual range of the driver 1. The driver 1 perceives the fringe pattern caused by pattern of the diffractive unit 6. The hologram is programmed into the fringe pattern and the fringe pattern corresponds to the reconstructed hologram and the projected objects 3, 4.

In one embodiment, the adjustable diffractive unit 6 comprises a plurality of phase retarding elements. Each of the phase retarding elements delays the phase of light reflected or transmitted by a specific amount. The amount of this phase delay is for each element individually controlled by a control unit 7. Any hologram imprinting a specific phase pattern into light of the light source 1 for forming the reconstructed hologram can be implemented this way. The control unit 7 provides different control patterns to generate different holograms via the diffractive unit 6.

The control patterns may be loaded from a data processing unit 8. The data processing unit 8 receives the sets of data to be displayed. Based on these sets the data processing unit 8 may select pre-calculated control pattern for respective holograms.

Some sets of data are provided as models of three-dimensional objects, e.g. the environment detected by a night vision system. The data processing unit 8 may calculate the corresponding hologram.

The virtual distance d of displayed objects 3, 4 is determined by the hologram. A displacement of the displayed objects 3, 4 is thus achievable and achieved by determining new holograms and controlling the diffractive unit 8 based on the new hologram. A simple shift of a displayed object 3, 4 can be calculated via a convolution with a displacement operator.

Figure 3:
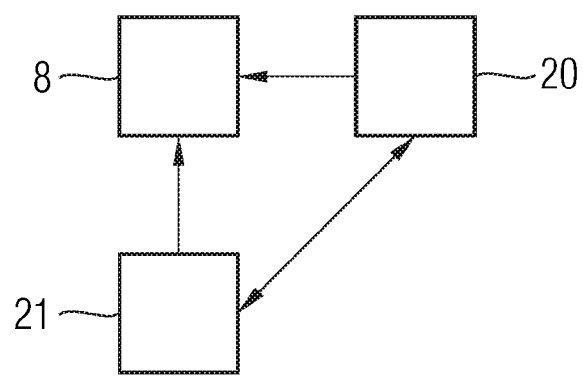
FIG. 3 is an embodiment of a holographic information display.

FIG. 3 illustrates that the data processing device 8 may obtain information from a navigation system 20 and/or a night vision system 21.

It is to be understood that more than two sets of data can be display via the present apparatus and method. The relation of any two of the sets of data to be displayed can be displayed according to the invention. For instance, all sets of data can be displayed in distinct layers, each layer being seen in a different virtual distance to the wind screen. It is not excluded that in some applications different sets of data are displayed in a single layer wherein other sets of data are displayed in a second or further layer. All of the above combinations are covered by the present invention.

The displayed hologram is not static, but is changed according to the set of data to be displayed. The sets of data are presented in form of two- or three-dimensional objects. The hologram is calculated to contain all information necessary to reconstruct a wave front representing the two-dimensional or three-dimensional objects at virtual distances. The projected objects seen by a driver or other persons are the reconstructed hologram. The reconstruction is effected by illuminating the hologram with the coherent light source. Preferably, the image of the reconstructed hologram is directed into the sight field of the driver.

The windscreen is used to deflect the image into the sight field of the driver. The objects projected via the reconstructed hologram appear to the driver to be placed outside the wind screen.

The virtual distance of the projected objects with respect to each other and with respect to the windscreen is determined by the hologram. It can be demonstrated that a hologram is based on a Fourier transformation of the objects to be displayed. A shift of the virtual distance of the objects to be displayed can be applied by a convolution of the hologram, where a parameter of the convolution is the desired shift of the virtual distance.

The visual impression of the driver can be that the first layer is closer to the wind screen than the second layer. Transparent areas of the first layer of the scenery can be transparent or semi-transparent. The transparent areas may contain no data to be displayed. The first set of data may contain data of higher priority than the data of the second set of data. An enhanced vision system may provide the second set of data in form of a three-dimensional representation of the vehicle environment.

A navigation system may provide a first set of data indicating a direction to a chosen destination, the first layer displaying a marker corresponding to the direction. The enhanced vision system may be connected to the interface for providing the second set of data in form of a three-dimensional representation of the vehicle environment. The navigation system may be connected to the interface for providing a first set of data indicating a direction to a chosen destination.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

What is claimed is:

1. A method for displaying data, comprising the steps:
providing a first set of data and a second set of data, wherein the first set of data is information associated with a vehicle, and the second set of data is representative of an environment associated with the vehicle;
creating a three-dimensional scenery displaying the first set of data in a first layer and the second set of data in a second layer, the first layer being separated from the second layer by a specified virtual distance;
determining a hologram corresponding to a recording of the scenery via a reference beam;
setting a plurality of controllable phase delay elements according to the determined hologram;
reconstructing the hologram by illuminating the plurality of phase delay elements using a coherent light source; and
directing the light of the reconstructed hologram into the visual field of a driver via a wind screen of the vehicle.

2. The method according to claim 1, wherein the three-dimensional scenery is created such that the first layer appears closer to the windscreen than the second layer in the visual field of the driver.

3. The method according to claim 2, wherein transparent areas of the first layer of the scenery are transparent or semi-transparent.

4. The method according to claim 3, the transparent areas contain no data to be displayed.

5. The method according to claim 1, wherein the first set of data contains data of higher priority than the data of the second set of data.

6. The method according to claim 1, wherein an enhanced vision system provides the second set of data in form of a three-dimensional representation of the vehicle environment.

7. The method according to claim 1, wherein a navigation system provides the first set of data, and the first layer displays a marker corresponding to a direction to a chosen destination.

8. A holographic information display comprising:
- a plurality of controllable phase delay elements for forming a hologram;
- a coherent light source for reconstructing the hologram via illuminating the hologram;
- an interface for receiving a first and a second set of data, wherein the first set of data is information associated with a vehicle, and the second set of data is representative of a vehicle environment associated with the vehicle;
- a scenery composing device for automatically creating the scenery according to a first and a second set of data in a first and a second layer, the first layer being separated from the second layer by a specified virtual distance;
- a transformation unit for automatically calculating the hologram corresponding to a recording of the scenery via a reference beam; and
- a control unit for controlling the plurality of phase delay elements according to the calculated hologram.

9. The holographic information display according to claim 8, wherein an enhanced vision system is connected to the interface for providing the second set of data in form of a three-dimensional representation of the vehicle environment.

10. The holographic information display according to claim 9, wherein a navigation system provides is connected to the interface for providing a first set of data indicating a direction to a chosen destination.

11. The holographic information display according to claim 8, wherein in the visual impression of a user a virtual distance to the first layer is less than a virtual distance to the second layer.

12. The holographic information display according to claim 11, wherein transparent areas of the first layer of the scenery are transparent or semi-transparent.

13. The holographic information display according to claim 12, the transparent areas contain no data to be displayed.

14. The holographic information display according to claim 11, wherein the first set of data contains data of higher priority than the data of the second set of data.

15. A method for displaying data, comprising the steps:
- providing a first set of data and a second set of data, wherein the first set of data contains data of higher priority than the data of the second set of data, the first set of data is information associated with a vehicle, and the second set of data is representative of a vehicle environment associated with the vehicle;
- creating a three-dimensional scenery displaying the first set of data in a first layer and the second set of data in a second layer, the first layer being separated from the second layer by a specified virtual distance;
- determining a hologram corresponding to a recording of the scenery via a reference beam;
- setting a plurality of controllable phase delay elements according to the determined hologram;
- reconstructing the hologram by illuminating the plurality of phase delay elements using a coherent light source; and
- directing the light of the reconstructed hologram into the visual field of a driver via a wind screen of a vehicle, wherein in the visual field of the driver, the first layer is closer to the wind screen than the second layer.

16. The method according to claim 15, wherein an enhanced vision system provides the second set of data in form of a three-dimensional representation of the vehicle environment.

* * * * *